United States Patent [19]

Keskey et al.

[11] Patent Number: 4,816,518

[45] Date of Patent: Mar. 28, 1989

[54] SOLID STATE THERMOSENSITIVE POLYMER COMPOSITIONS

[75] Inventors: William H. Keskey; James E. Schuetz, both of Midland, Mich.

[73] Assignee: The Dow Chemical Company, Midland, Mich.

[21] Appl. No.: 714,242

[22] Filed: Mar. 21, 1985

[51] Int. Cl.$^4$ ............................................. C08L 39/00
[52] U.S. Cl. .................................... 525/204; 525/931
[58] Field of Search ........................ 525/931, 204, 240

[56] References Cited

U.S. PATENT DOCUMENTS

| | | | |
|---|---|---|---|
| 3,236,914 | 2/1966 | Murdock et al. | 525/931 |
| 3,509,235 | 4/1970 | Riemhofer et al. | 260/873 |
| 4,508,869 | 4/1985 | Keskey et al. | 524/808 |

Primary Examiner—Carman J. Seccuro

[57] ABSTRACT

Substantially solid state thermoplastic thermal radiation suppressor composition for suppressing thermal radiation transmission comprise a thermoplastic substance (e.g., a polymer of polymerized styrene, methyl methacrylate and 2-isopropenyl-2-oxazoline) in intimate contact with a composition (e.g., a polymer of polymerized ethylene and acrylic acid) which exhibits a refractive index essentially equal to that of said thermoplastic substance at one temperature but a refractive index different from that of said thermoplastic substance at another temperature. The thermal radiation suppressor compositions exhibit good physical properties and can be employed in the form of thermoplastic sheets or films. The compositions are useful as devices in greenhouses, skylights, etc.

11 Claims, No Drawings

SOLID STATE THERMOSENSITIVE POLYMER COMPOSITIONS

BACKGROUND OF THE INVENTION

The present invention relates to devices exhibiting a variable transmittance of light and radiant heat, and in particular to such devices which are substantially solid state in nature.

In bright sunlight, closed edifices made primarily from glass and buildings having numerous glass windows experience heat buildup due to the transfer of heat from the sun through the glass via radiation. Heretobefore, glass has been coated by some means to prevent this heat transfer. For example, greenhouses, especially the roof areas thereof, are sprayed with white or green pigment thereby reducing light transmission and the corresponding heat buildup. Application of pigment is difficult, must be repeated at regular intervals, and leaves an aesthetically undesirable appearance. More importantly, although light and radiant heat transmission can be desired at various times, pigmentation permanently reduces the transmission of heat and light.

More recently, various attempts have been made to provide devices capable of providing a variable transmittance of light and radiant heat. For example, reflective-transparent solar control films can be coated onto glass as described in U.S. Pat. No. 3,290,203. However, as noted in U.S. Pat. No. 4,260,225, such a device suffers numerous deficiencies. In addition, U.S. Pat. No. 4,260,225 discloses deficiencies of permanently transluscent plastic films which replace glass in greenhouse covers.

Energy saving devices are disclosed in U.S. Pat. Nos. 4,260,225; 4,085,999; 4,082,892 and 4,307,942. Such devices typically comprise light transmissive (i.e., transparent) layers which enclose a region containing a polymeric material which is capable of transmitting light at one temperature but which becomes less transparent at another temperature. Thus, such devices are believed to result in energy savings because radiant heat energy is transmitted through the device to a much less extent at higher temperatures.

Although such systems provide an effective means for preventing unwanted heat from entering a building, such systems are severely limited in their practical use. For example, exterior portions of buildings are frequently exposed to severe weather conditions, and in particular are exposed to temperatures as low as about −50° F. Unfortunately, devices containing the aforementioned polymeric materials are susceptible to freezing which causes cracking or other destruction of the device. In addition, wide fluctuations in temperature, particularly temperatures above the cloud point of the polymeric material cause settling problems of the active polymeric material.

More recently, as disclosed in U.S. Pat. No. 4,260,225 energy saving radiant insulative devices contain water-soluble polymers which exhibit an inverse solubility with an increase in temperature, water and an organic liquid which lowers the freezing point of the polymeric fluid system. Unfortunately, such systems require polymeric fluids which have a high polymer concentration and exhibit a high viscosity. Such high viscosity systems are often difficult to handle and can often introduce undesirable air bubbles into the polymeric fluid system. In addition, the addition of various organic liquids such as glycols in certain amounts to such polymeric fluid systems do not necessarily allow the desired change in transmittance of radiant energy in the desired temperature range. For example, polymeric fluid systems containing certain glycols may provide low radiant energy transmittance over an undesirably wide temperature range, or may provide little or no decrease in radiant energy transmittance over a wide temperature range. In addition, fluid-based systems are difficult to handle and provide problems in the manufacture of energy saving radiant energy insulative devices. Furthermore, fluid-based systems can provide problems associated with glass pane breakage, particularly when large radiant energy insulative devices are manufactured.

Various transparent-translucent materials are disclosed in U.S. Pat. Nos. 4,409,383; 4,444,846 and 4,206,980. However, it would be desirable to prepare substantially solid state thermal radiation suppressor compositions using effective and efficient techniques.

In view of the deficiencies of the prior art, it would be highly desirable to provide a practical device for inhibiting the transmission of solar energy above a predetermined temperature range, but which permits transmission of said energy below that temperature range, which device comprises substantially solid state temperature sensitive substances contained in said device.

SUMARY OF THE INVENTION

The present invention is a substantially solid state thermoplastic thermal radiation suppressor composition for suppressing thermal radiation transmission comprising a thermoplastic substance in intimate contact with a composition (i.e., a so-called "other composition") which exhibits a refractive index essentially equal to that of said thermoplastic substance at a temperature or in a temperature range but which exhibits a refractive index different from that of said thermoplastic substance at another temperature or in another temperature range, such that said thermal radiation suppressor composition can suppress thermal radiation above a predetermined temperature range.

The present invention, in another aspect, is a device for inhibiting the transmission of solar energy at a predetermined temperature range, but which permits transmission of said energy at a different temperature range, which device is useful over a wide temperature range and which device comprises a light transmissive enclosure member containing the aforementioned thermoplastic thermal radiation suppressor composition.

By the term "intimate contact" is meant that the essential thermoplastic substance and the other composition form a stable dispersion or a substantially non-delaminating layered material. By the term "stable dispersion" is meant that a dispersion having a continuous phase and a discontinuous phase maintains a substantially constant morphology upon repeated heating and cooling conditions experienced during practical use.

The thermal radiation suppressor compositions of this invention provide the skilled artisan with a means for providing a process for improving the usefulness of devices which inhibit the transmission of solar energy at a predetermined temperature range, but which permits transmission of said energy at a different temperature range. That is, the thermal radiation suppressor composition can be described as an energy saving insulative device which is clear/cloud capable. That is, the device can be clear at one temperature or temperature range and cloudy at a different temperature or temperature range.

When the radiation suppressor composition of this invention is heated by sunlight or some other radiant heat source to a preselected temperature, the refractive indices of the thermoplastic substance and the composition in intimate contact therewith diverge. This divergence in refractive index turns the radiation suppressor composition sufficiently less transparent in order to significantly reduce the transmission of light and radiant heat through the composition. When the composition cools to a temperature below the preselected temperature, the refractive indices again match and the radiation suppressor composition again becomes permeable to the passage of light and radiant heat. Thus, the insulative device serves to maintain a more constant level of naturally supplied light and temperature in a building or like structure thereby reducing energy consumption.

The insulative device of this invention is particularly useful in any application where radiation buildup of undesirable light transmission through glass, transparent plastic sheet or the like exists. For example, these devices can be employed in greenhouses, agricultural tunnels, skylights, office buildings, factories, schools, homes, workshops, laboratories and other buildings in which on sunny days some light is desirable, but diffused light is better than direct sunlight; and on cold or cloudy days, transmission of essentially all naturally supplied light is desirable.

DETAILED DESCRIPTION OF THE INVENTION

Representative devices and apparatus useful in this invention are disclosed in U.S. Pat. Nos. 4,260,225; 4,085,999; 4,082,892 and 4,307,942, all of which are incorporated herein by reference in their entirety. That is, devices useful herein comprise, for example, two generally transparent panels or layers which are separated from one another. Typically, the panels or layers are glass or plastic panes or sheets which are spaced apart from one another by a device such as a frame. The panels or layers can be treated materials which darken when exposed to light and/or radiation or which contain radiation reflective materials. The region between the panels contains the aforementioned thermal radiation suppressor compositions, typically in the form of a sheet or film between the panels. Alternatively, thermal radiation suppressor compositions can be employed as are typical thermoplastic sheets or films.

The thermoplastic substance in intimate contact with the other composition generally is in the form of a blend of materials, and in particular a blend of polymeric materials. The term "blend" as employed herein in referring to blends of polymeric materials refers to those substantially solid mixtures of two or more polymers which are commonly referred to in the art as polymer blends or polymer alloys. The terms "compatible blend" or "miscible blend" and like terms, are not necessarily employed in the strict sense as meaning that the blend exhibits a single glass transition temperature, but instead is used to describe a blend which exhibits properties, especially physical properties, which are at least intermediate to those of the component polymers. Compatible blends can be employed to provide tough pliable films or sheets of thermoplastic radiation suppressor composition. By contrast, an "incompatible blend" or "immiscible blend" as used herein, refers to a blend which exhibits properties which are significantly poorer than those of the component polymers, especially significantly poorer than the thermoplastic polymeric material.

Temperature sensitive substances of this invention are those substances which exhibit a refractive index at one temperature or temperature range, and a different refractive index or indices at a different temperature or temperature range. Compositions of this invention comprise at least one temperature sensitive substance and at least one substance which exhibits a refractive index relationship with temperature that differs from that relationship of the temperature sensitive substance.

Critical to this invention is that the refractive indices of the components of the thermal radiation suppressor composition be essentially equal at a particular temperature or in a particular temperature range. Such a composition provides the necessary clarity at certain temperatures or temperature ranges (i.e., the components each exhibit different refractive index relationships with respect to temperature). Also necessary to this invention is the fact that the refractive indices of the components of the thermal radiation suppressor composition differ from one another at a different temperature or temperature range. For good clarity, it is desirable that the aforementioned refractive indices match as closely as possible. For good radiation suppression, it is desirable that the aforementioned refractive indices differ to as great an extent as possible.

The thermoplastic substance can vary. One factor which is considered in selecting the composition of the thermoplastic substance is the refractive index of the thermoplastic substance. That is, it is desirable that the substance exhibit a functionally effective clarity and a particular refractive index at a particular temperature. The composition of the thermoplastic substance depends upon the refractive index properties of the other composition which is employed. In addition, the composition of the thermoplastic substance is such that when in intimate contact with the other composition, a stable dispersion or a substantially non-delaminating layered material results. Typically, such compatible blends or stable dispersions, or non-delaminating layered materials, comprise a compatibilizing amount of linking between substances comprising the thermal radiation suppressor composition. A compatibilizing amount of linking can be provided by the reaction of the compatibilizing moieties (e.g., cyclic iminoether moieties) of thermoplastic substance and the coreactive group of the other composition.

Preferably, the temperature sensitive substances are thermoplastic materials. Most preferably, the thermal radiation suppressor composition comprises an intimate admixture of a thermoplastic polymer containing a compatibilizing amount of repeating units containing a pendant cyclic iminoether group, and at least one thermally sensitive thermoplastic substance containing a compatibilizing amount of repeating units containing a coreactive group which is capable of reacting with said cyclic iminoether group to form a linkage between the components of the temperature sensitive composition. The polymers can be said to be incompatible when each do not contain such compatabilizing cyclic iminoether and coreactive groups, respectfully. The amount of cyclic iminoether group which is required to compatibilize the temperature sensitive polymer and other polymer depends somewhat on the particular polymer employed, the relative amount thereof present in the blend and the amount of coreactive groups on the other polymer. However, in general, a compatibilizing amount of said cyclic iminoether group is present when the repeating units containing said cyclic iminoether group comprise polymerized monomeric units representing at least about 0.01 weight percent of the polymer.

The cyclic iminoether group of the thermoplastic substance can form a linkage with a coreactive group on the other composition. It is understood that the degree of linking and the nature of the composition of the intimately contacted materials can also be controlled by varying the proportion of cyclic iminoether and coreactive groups present in the materials of the blend. In fact, with control of the amounts of such groups in the blend, the blend of this invention can be prepared as desired to form a very lightly crosslinked thermoplastic blend or a very highly crosslinked material. However, it is only essential herein that the amount of cyclic iminoether group in said polymer (and coreactive group on temperature sensitive thermoplastic substance) be sufficient to compatibilize compositions in the blend. Most typically, the polymer contains from about 0.01 to 10 in weight percent of monomeric repeating units containing pendant cyclic iminoether groups, more preferably, the first polymer contains from about 0.1 to about 5 weight percent of such repeating units. Such cyclic iminoether groups are advantageously described by the general structure described in U.S. Pat. No. 4,474,923. Such structures are provided, for example, by addition polymerizing with the other monomers 2-alkenyl-2-oxazoline monomers, preferably 2-isopropenyl-2-oxazoline. Examples of monomers which can be polymerized to provide thermoplastic substance of this invention include the styrenics such as styrene, vinyl toluene, t-butyl styrene, α-methyl styrene, and the like; the alkyl esters of α,β-ethylenically unsaturated acids such as butyl acrylate, methyl methacrylate, ethyl hexyl acrylate and the like; monomers such as vinylidene chloride, vinyl acetate; and the like. The type and amounts of monomers relative to one another, which monomers are polymerized to yield the thermoplastic substance will depend upon factors such as the desired refractive index and desired clarity of the resulting polymer. A preferred polymer is one which comprises polymerized styrene as a component of the polymer. An example of a suitable thermoplastic substance is a polymer comprising in polymerized form 83 weight percent methyl methacrylate, 15 weight percent styrene and 2 percent isopropenyloxazoline, which exhibits a refractive index of 1.510 at 20° C. Another example of a suitable thermoplastic substance is a polymer comprising in polymerized form 58 weight percent methyl methacrylate, 25 weight percent n-butyl acrylate, 15 weight percent styrene and 2 weight percent isopropenyl oxazoline, which exhibits a refractive index of about 1.507 at 20° C. Typically such polymers are prepared using conventional emulsion polymerization techniques in order to provide an aqueous latex dispersion product which can be treated in order to isolate a polymer product. Typical isolation techniques include air or oven drying, freeze coagulation, or chemical coagulation using materials such as calcium chloride. Such polymers also can be prepared using conventional bulk or mass polymerization techniques.

The other composition, which is in intimate contact with the thermoplastic substance of the temperature sensitive composition, can vary. It is understood that the composition of the other composition can vary to the extent that the desired refractive index properties are achieved. In addition, the required compatibility of components of the thermal radiation suppressor composition is necessary in order to provide a composition having desirable physical properties. For this reason, in the most preferred instance when the other composition is a polymeric material, the other composition typically comprises compatibilizing amounts of compatibilizing moieties polymerized therein.

The other substance is preferably a thermoplastic polymer which exhibits the necessary temperature sensitivity, which is capable of being compatible with the thermoplastic substance, or which contains or can be modified to contain a coreactive group. Typical polymers comprise polymerized monomers such as olefins, such as ethylene and/or propylene, vinyl halides, vinylidene halides, and the like. Preferred polymers comprise a polymerized olefin as a component of the polymer. In order to be useful herein said polymer is generally a copolymer of an addition polymerizable monomer which contains said coreactive group or which can be modified subsequent to polymerization to impart said coreactive group thereto. For example, any of the aforementioned addition polymers can be copolymerized with an addition polymerizable carboxylic acid (e.g., acrylic acid or methacrylic acid) to impart carboxyl groups to the polymer. Amino groups, amide groups and like coreactive groups can be imparted to the other polymer in similar manner by copolymerizing a monomer mixture containing the desired proportion of an addition polymerizable monomer containing such group. Other suitable polymers include those which contain amine, carboxylic acid, hydroxyl, epoxy, mercaptan, anhydrate and like groups in the polymer chain or as end groups therein. An example of a particularly desirable copolymer is a copolymer of an olefin and an ethylenically unsaturated carboxylic acid, as for example, a copolymer of ethylene and acrylic acid. Another particularly useful copolymer is the magnesium or zinc ionomer of the polymers comprising polymerized olefin and ethylenically unsaturated carboxylic acid. For example, a magnesium ionomer of the ethylene/acrylic acid copolymer can be employed. Another example of a useful polymer is a zinc ionomer of ethylene/methacrylic acid which is sold commercially as Surlyn ® by E. I. duPont de Nemours Co., Inc. Such a polymer exhibits a refractive index of about 1.508 at 23° C. and about 1.502 at 39° C. Also, graft or block copolymers wherein at least one of the grafted segments or blocks contain a reactive group can be employed herein.

Polymers of certain monomers such as vinyl or vinylidene halide or acrylonitrile can be modified after the polymerization thereof to impart coreactive moieties thereto. For example, vinyl chloride can be reacted with ammonia or a primary amine to place pendant amine groups on the polymer. Similarly, acrylonitrile can be hydrogenated after its polymerization to form pendant amine groups. Certain other polymers which normally contain coreactive groups can be employed herein. For example, polymers containing repeating amine linkages, such poly(ethyleneimine) or a partially hydrolyzed poly(2-alkyl-2-oxazoline) are suitable as the other polymer herein.

An example of a particularly useful temperature sensitive polymer includes a polymer comprising in polymerized form 91 weight percent ethylene and 9 weight percent acrylic acid. Such a polymer exhibits a refractive index of about 1.509 at 20° C. and of about 1.495 at 50° C. Another example of a useful polymer is a polymer comprising in polymerized form 80 weight percent ethylene and 20 percent acrylic acid. Such a polymer exhibits a refractive index of about 1.506 at 20° C. and about 1.490 at 50° C.

The blends of this invention are advantageously prepared from the component substances (e.g., polymers) by conventional melt blending or solution blending techniques. Melt blending is advantageously performed by heating each polymer to a temperature about its softening point and thoroughly mixing the softened polymers. Solution blending is performed by dissolving each component polymer into a common solvent and precipitating the dissolved polymers therefrom. Melt blending is the preferred method of preparing the blends of this invention.

Typically the compatibilizing of the components of the thermal radiation suppressor composition is achieved by the application of a moderate amount of heat to the blends. The amount of heat required is typically dependent on the particular coreactive group employed. In general, carboxylic acid groups are more reactive than amide, amine or hydroxyl groups and therefore require lower temperatures to form such crosslinkages. Usually, when a hot blending technique is employed to form the blends, the temperature at which the melt blending is performed is generally sufficient to cause the formation of linkages therein. Generally, and especially when the coreactive group is a carboxylic acid, such linkages are formed in one minute or less at the temperatures used to melt blend the polymers. It may be desirable to incorporate into the blend a catalyst which increases the rate of the reaction between the iminoether and coreactive group. Lewis acids such as zinc chloride or iron chloride are suitable as such catalysts. In addition, it may be desirable to include a plasticizer or lubricant in the blends in order to facilitate the iminoether and coreactive groups contacting each other in the blending process. However, the inclusion of either a catalyst, plasticizer or lubricant is optional herein. It is also desirable to incorporate into the composition additives such as UV radiation absorbers and heat stabilizers.

The amount of each of the components which form the composition of this invention can vary. Typically, a blend comprising from about 10 to about 90 weight percent thermoplastic substance, and from about 10 to about 90 weight percent other composition can be employed. Preferably a blend comprising about 50 weight percent thermoplastic substance and about 50 weight percent other composition is employed.

Blends of this invention can be compression molded, injection molded or extrusion molded to the desired shape. Typically, the materials are molded into films or sheets. Thicknesses of the materials can vary, however, films or sheets typically range from about 0.5 mil to about 20 mil, preferably from about 5 mil to about 10 mil, in thickness.

Devices of this invention are useful over a wide range of temperatures. In particular, a useful temperature range wherein the device is employed extends from about −50° F. to about 200° F., preferably from about −50° F. to about 150° F. The devices are useful in this temperature range and do not undergo undesirable destruction due to substantial thermal expansion and/or substantial component degradation.

The following examples are presented to further illustrate but not limit the scope of this invention. All parts and percentages are by weight unless otherwise indicated.

EXAMPLE 1

A methyl methacrylate/styrene/isopropenyloxazoline polymer is provided as follows: Into a 1-liter reaction vessel equipped with nitrogen purge, stirring device, addition funnel, feed ports and condenser is charged 360 grams (g) deionized water, 3 g of a 1 percent active aqueous solution of the penta-sodium salt of diethylenetriaminepentaacetic acid, 4.5 g of polystyrene seed particles having an average diameter of about 260 Å, and 0.1 g of a 28 percent active aqueous ammonium hydroxide solution. The mixture is subjected to nitrogen sparge, stirring and heating until a temperature of 90° C. is obtained. When the temperature of 90° C. is obtained, two separate feeds are added to the reaction mixture in a continuous manner and the commencement of addition of the feeds is performed concurrently. One feed comprises 249 g methyl methacrylate, 45 g styrene, 6 g anhydrous isopropenyl oxazoline and 1.5 g isooctyl thioglycolate, and is added over a 120 minute period. The second feed comprises 90 g deionized water, 3.3 g of a 45 percent active aqueous solution of an alkyl substituted diphenyl oxide dialkali metal sulfonate, which formulation is sold as Dowfax® 2A1 by The Dow Chemical Company, 1.5 g sodium persulfate, 0.3 g sodium hydroxide and 0.75 g of a 28 percent active aqueous solution of ammonium hydroxide, and is added over a 130 minute period. The reaction mixture is stirred and held at 90° C. during concurrent addition of both of the feeds. After the feed addition is complete, the reaction mixture is stirred and held at 90° C. for an additional 90 minutes. The mixture is cooled to room temperature and poured through a −200 mesh screen. The mixture is poured onto a tray and air dried. The dried material is heated in an oven at 65° C. for about an hour. The dried material is ground to a powder form.

A blend of polymers is prepared by mixing 22.5 g of the methyl methacrylate/styrene/isopropenyloxazoline polymer with 22.5 g of a polymer comprising in polymerized form 91 percent ethylene and 9 percent acrylic acid. The ethylene/acrylic acid polymer is sold commercially as EAA 469 by The Dow Chemical Company. The polymer blend is further processed using a Brabender Roller 5/R.B. The polymers are processed at 195° C. at 50 rpm mixing rate for 3 minutes. The resulting pieces of polymer blend are compression molded to a film using a Carver Laboratory Press Model B at a temperature of 180° C. The pieces are placed between duPont Mylar polyester sheets sprayed with mold release agent, and a 4 inch by 4 inch templet of 5 mil thickness. The sample is then placed between two chrome-steel plates and placed in the heated Carver press. The pressure in the press is increased to 20,000 pounds for 3 minutes. The pressure is released and the sample is quenched in cold water. The film of ethylene acrylic acid polymer dispersed in the methyl methacrylate/styrene/isopropenyloxazoline polymer is designated as Sample No. 1.

The percent transmission of visible light (600 nm) through the sample at various temperatures is determined using a Perkin-Elmer Model 330 UV-Vis-NIR Spectrophotometer. Data are presented in Table I.

TABLE I

| Temperature (°C.) | Percent Transmission |
| --- | --- |
| 23 | 85 |

TABLE I-continued

| Temperature (°C.) | Percent Transmission |
| --- | --- |
| 30 | 64 |
| 40 | 50 |
| 50 | 38 |
| 60 | 27 |
| 70 | 18 |

The data in Table I illustrate that as the temperature of the sample increases, the percent transmission decreases. At room temperature (23° C.) the percent transmission of visible light is acceptably high for use of the sample in a glazing application.

EXAMPLE 2

In a manner as described in Example I is prepared and isolated a dried powder of polymer comprising in polymerized form 186 g methyl methacrylate, 36 g styrene, 75 g butyl acrylate and 3 g isopropenyloxazoline. A film of this polymer and a dispersed phase ethylene acrylic acid polymer comprising in polymerized form 80 percent ethylene and 20 percent acrylic acid and sold commerically as Primacor 5980 by The Dow Chemical Company is provided in a manner as described in Example I. This sample is designated as Sample No. 2. Data concerning the percent transmission of visible light (769 nm) through the sample at varous temperatures are determined as is described in Example I. Data are presented in Table II.

TABLE II

| Temperature (°C.) | Percent Transmission |
| --- | --- |
| 20 | 84 |
| 30 | 79 |
| 40 | 74 |
| 50 | 68 |
| 60 | 60 |
| 70 | 49 |
| 80 | 26 |

The data in Table II illustrate that as the temperature of the sample increases, the percent transmission decreases. At room temperature (20° C.) the percent transmission of visible light is acceptably high for use of the sample in a glazing application.

EXAMPLE 3

In a manner as described in Example I is prepared and isolated a dried powder of polymer comprising in polymerized form 45 g styrene, 252 g methyl methacrylate, and 3 g isopropenyloxazoline. A film of this polymer and an ethylene acrylic acid polymer comprising in polymerized form (91) percent ethylene and (9) percent acrylic acid is prepared in a manner as described in Example 1. The sample is designated as Sample No. 3. Data concerning the percent transmission of visible light (600 nm) through the sample at various temperatures are determined as is described in Example 1. Data are presented in Table III.

TABLE III

| Temperature (°C.) | Percent Transmission |
| --- | --- |
| 23 | 83 |
| 30 | 75 |
| 40 | 60 |
| 50 | 42 |
| 60 | 27 |
| 70 | 15 |

The data in Table III illustrate that as the temperature of the sample increases, the percent transmission decreases. At room temperature (23° C.) the percent transmission of visible light is acceptably high for use of the sample in a glazing application.

EXAMPLE 4

For comparison purposes is prepared a sample in the form of a film. The sample comprises a blend of a polymer powder prepared from 45 g styrene and 255 g methyl methacrylate monomers using polymerization and isolation techniques described in Example 1 and the ethylene acrylic acid polymer described in Example 1. The comparative sample is designated as Sample No. C-1. Physical properties of Sample Nos. 1 and C-1 are determined by cutting the resulting films into 0.5 inch wide strips and testing on an Instron Tensile Tester. Results are presented in Table IV.

TABLE IV

| Sample No. | Percent Elongation | Tensile Strength (psi) |
| --- | --- | --- |
| 1 | 100 | 2700 |
| C-1* | N.M. | N.M. |

*Not an example of the invention. N.M. indicates not measurable as the properties of the film are extremely poor.

The data in Table IV indicate that the samples of the invention exhibit acceptably high film properties. The comparative sample does not exhibit desirable film properties.

EXAMPLE 5

The methyl methacrylate/styrene/isopropenyloxazoline polymer of Example 2, the ethylene acrylic acid polymer of Example 2, and the blend of these polymers (using techniques as described in Example 2), are each formed into films in a manner as described in Example 2. The refractive indices of samples (designated as Sample No. C-2, Sample No. C-3 and Sample No. 2, respectively) are measured at various temperatures using a Bausch and Lomb refractometer equipped with a water bath and temperature control heater. Data are presented in Table V.

TABLE V

| Sample No. | Refractive Index | Temperature (0° C.) |
| --- | --- | --- |
| C-2* | 1.5036 | 23 |
| | 1.5010 | 40 |
| | 1.4995 | 50 |
| C-3* | 1.5024 | 23 |
| | 1.4952 | 40 |
| | 1.4895 | 50 |
| 2 | 1.5030 | 23 |
| | 1.4990 | 40 |
| | 1.4950 | 50 |

*Not an example of the invention.

The data in Table V illustrate that the thermoplastic substance (Sample No. C-2) exhibits a refractive index relationship with respect to temperature while the other composition (Sample No. C-3) exhibits a different refractive index with respect to temperature. The data illustrate that the refractive indices of each of Sample No. C-2 and Sample No. C-3 are nearly equal at 23° C. and diverge from one another at 50° C. The data also illustrate that the Sample No. 2 (which is illustrated in Example 2 as exhibiting good light transmission at 23° C. and poorer light transmission at 50° C.) exhibits a refractive index intermediate to the component compositions.

What is claimed is:

1. A substantially solid state thermoplastic thermal radiation suppressor for suppressing thermal radiation transmission above a predetermined temperature range comprising:
   (a) a thermoplastic polymer containing a compatibilizing amount of repeating units containing a pendant cyclic iminoether group, and
   (b) a thermoplastic polymer containing a compatabilizing amount of repeating units containing a coreactive group which is capable of reacting with said cyclic iminoether group to form a linkage, wherein said (a) and (b) are normally incompatible in the absence of said pendant cyclic iminoether group and said coreactive group;
   said composition characterized by (a) and (b) exhibiting a refractive index essentially equal at a temperature or in a temperature range but exhibiting a refractive index different from each other at another temperature or in another temperature range.

2. The substantially solid state thermal radiation supressor of claim 1 in the form of a sheet or film.

3. The substantially solid state thermal radiation suppressor of claim 1 wherein said composition is capable of being employed within a temperature range from about −50° F. to about 200° F.

4. The substantially solid state thermal radiation suppressor of claim 1 wherein said (a) contains a pendant cyclic iminoether group from about 0.01 to about 10 percent by weight of said (a) and said (b) contains said coreactive group from about 0.01 to about 10 percent by weight of said (b).

5. The substantially solid state thermal radiation suppressor of claim 4 wherein said coreactive group is an electrophilic group containing an active hydrogen.

6. The substantially solid state thermal radiation suppressor of claim 5 wherein said electrophilic group ontaining an active hydrogen is a carboxylic acid, amino or hydroxyl group.

7. The substantially solid state thermal radiation suppressor of claim 1 wherein the cyclic iminoether group is a 2-oxazoline group.

8. The substantially solid state thermal radiation suppressor of claim 1 wherein said (a) is a polymer comprising polymerized styrene and said (b) is an olefin.

9. The substantially solid state thermal radiation suppressor of claim 8 wherein said (b) is a polymer of ethylene and/or propylene.

10. The substantially solid state thermal radiation suppressor of claim 9 wherein said (a) is a copolymer comprising polymerized styrene and a 2-alkenyl-2-oxazoline and said (b) comprises a polymer of polymerized ethylene and an a,b-ethylenically unsaturated carboxylic acid.

11. The substantially solid state thermal radiation suppressor of claim 10 wherein said (a) is a copolymer comprising polymerized styrene, methyl methacrylate and 2-isopropenyl-2-oxazoline, and said (b) is a copolymer of ethylene and acrylic acid.

* * * * *